(12) United States Patent
Kouzaki

(10) Patent No.: US 6,891,641 B1
(45) Date of Patent: May 10, 2005

(54) METHOD AND APPARATUS FOR CONVERTING NUMBER OF COLORS AND PROCESSING IMAGE DATA

(75) Inventor: Masahiro Kouzaki, Gamagoori (JP)

(73) Assignee: Minolta Co., Ltd., Osaka (JP)

( * ) Notice: Subject to any disclaimer, the term of this patent is extended or adjusted under 35 U.S.C. 154(b) by 964 days.

(21) Appl. No.: 09/645,586

(22) Filed: Aug. 25, 2000

(30) Foreign Application Priority Data

Aug. 27, 1999 (JP) ............................................ 11-241250
Sep. 30, 1999 (JP) ............................................ 11-278959

(51) Int. Cl.$^7$ ................................................ H04N 1/40
(52) U.S. Cl. ...................... 358/3.05; 358/3.06; 358/534
(58) Field of Search ........................ 358/1.9, 3.03–3.09, 358/534–536

(56) References Cited

U.S. PATENT DOCUMENTS 5,402,245 A * 3/1995 Motta et al. .................. 358/1.9
5,621,546 A    4/1997 Klassen et al. ............. 358/536
5,757,517 A * 5/1998 Couwenhoven et al. .... 358/463

FOREIGN PATENT DOCUMENTS

JP          9-307776        11/1997
JP          10-93830         4/1998

* cited by examiner

*Primary Examiner*—Thomas D. Lee
*Assistant Examiner*—Stephen Brinich
(74) *Attorney, Agent, or Firm*—McDermott Will & Emery LLP

(57) ABSTRACT

A method and an apparatus are provided in which a color of an input image can be reproduced with high accuracy by a small number of colors, and an image quality except the color reproducibility can be optimized. A color of each pixel of the input image is converted into one color selected from a plurality of reproducible colors, and an error due to the conversion is diffused into pixels surrounding the target pixel. In this conversion of the number of colors, a plurality of rules to be selected for a plurality of reproducible colors is prepared. One of the plural rules is selected to be applied for the whole or each part of the input image.

11 Claims, 8 Drawing Sheets

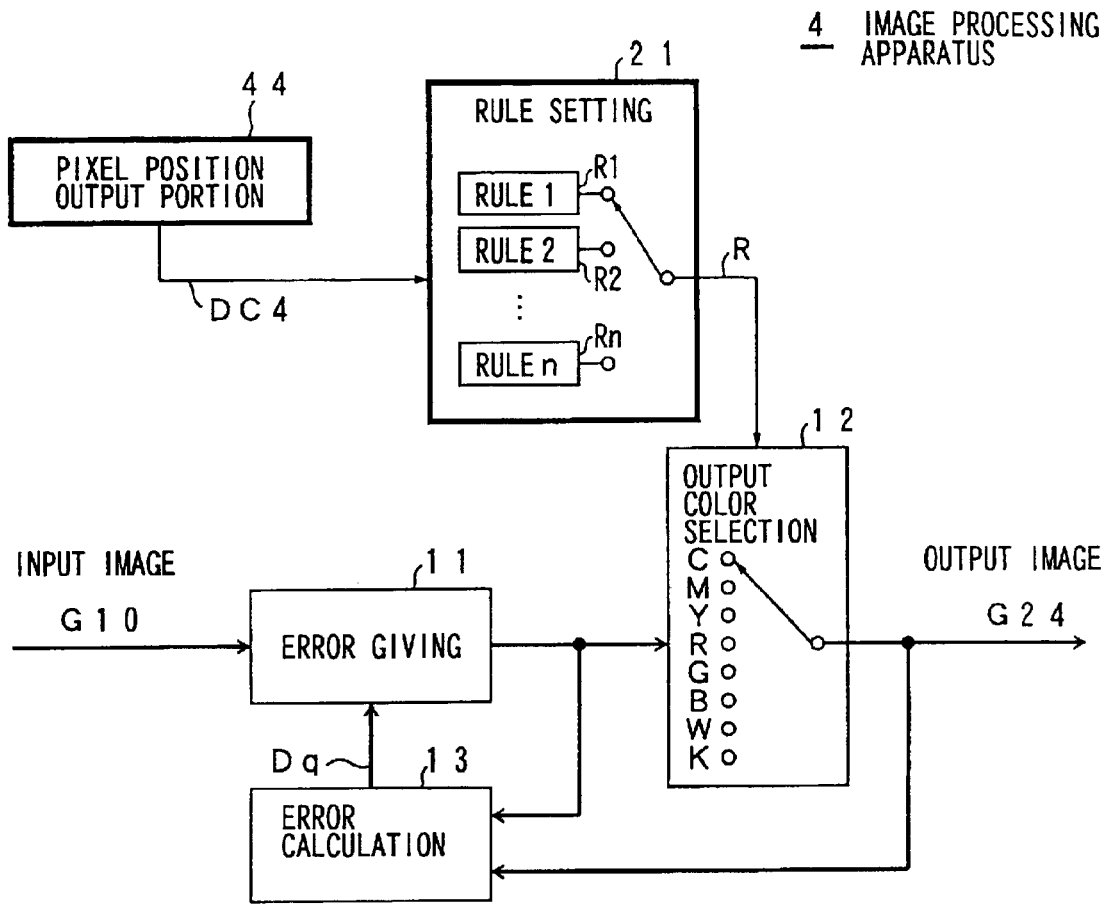

SJ

| CONDITION | POTENTIAL COLOR SET | SELECTION STANDARD |
|---|---|---|
| CONDITION 1 | SET 1 | EQUATION F1 IS THE SMALLEST |
| CONDITION 2 | SET 2 | EQUATION F2 IS THE SMALLEST |
| CONDITION 3 | SET 3 | EQUATION F3 IS THE SMALLEST |
| ... | ... | ... |
| CONDITION n | SET n | EQUATION Fn IS THE SMALLEST |
| OTHERS | EIGHT COLORS | NORMAL STANDARD |

Fig. 8

(a)
$$\alpha|\Delta X| + \beta|\Delta Y| + \gamma|\Delta Z| = Min$$

$\alpha, \beta, \gamma$ : CONSTANTS ADJUSTED AS NECESSITY (b)
$$\alpha|1-\Delta X/Xt| + \beta|1-\Delta Y/Yt| + \gamma|1-\Delta Z/Zt| = Min$$

Xt, Yt, Zt : XYZ VALUES OF THE OUTPUT TARGET COLOR $\alpha, \beta, \gamma$ : CONSTANTS ADJUSTED AS NECESSITY (c)
$$\alpha|\Delta L| + \beta|\Delta C| + \gamma|\Delta H| = Min$$

$\alpha, \beta, \gamma$ : CONSTANTS ADJUSTED AS NECESSITY

METHOD AND APPARATUS FOR CONVERTING NUMBER OF COLORS AND PROCESSING IMAGE DATA

This application is based on Japanese Patent Application No. 241250/1999 filed on Aug. 27, 1999 and No. 278959/1999 filed on Sep. 30, 1999, the contents of which are incorporated herein by reference.

BACKGROUND OF THE INVENTION

1. Field of the Invention

The present invention relates to a method and an apparatus for converting the number of colors by error diffusion, and for generating image data with good color by applying a color error diffusion process to select an appropriate color as an output color for each pixel.

2. Description of the Prior Art

A binary process such as an error diffusion method is used to output a halftone color image to a binary printer or to reduce data quantity when saving or transmitting image data.

As shown in FIG. 10, in a conventional image processing apparatus 80 utilizing the error diffusion method, a peripheral error giving portion 81 performs correction to input image data DI by distributing an error generated by the previous process. Corresponding to the corrected image data, an output color selection process portion 82 selects an appropriate color as an output color and outputs the selected color as output image data DO. An error calculation and memory portion 83 calculates an error between the image data inputted to the output color selection process portion 82 and the output color selected by the output color selection process portion 82 and memorizes the error. The selected output color is halftone data.

The peripheral error giving portion 81 gives an error that is calculated by a weight matrix with respect to an error generated in the pixel that was already processed and a position of the target pixel (this matrix is also called a diffusion matrix) to the input image data DI. The output color selection process portion 82 performs a binary process using a reference value.

In a usual error diffusion method, the input image data DI is continuous halftone data, and the output image data DO to be actually outputted is binary data. Using an error diffusion method, the color and the density of the input image data DI of the original image are maintained so that relatively faithful image can be reproduced. In addition, the binary process can compress the image data so that the amount of storage required for memorizing the output image data DO can be reduced. This image processing apparatus is disclosed in Japanese unexamined patent publication No. 9-307776, for example.

In the conventional binary process, concerning a full color image, the binary process is performed independently for each signal such as CMYK or RGB, which is dependent on an output device such as a printer or a display device. When the output or the display is performed, the signals or the outputs are composed so that a full color image is reproduced mimetically.

However, the calorimetric value of each output color depends on a device. In addition, when generating a halftone color using the same output apparatus, even if a dot incidence of each color CMYK is the same, the color can be seen different when the extents of overlaying are different. In a usual color error diffusion process, an input signal depending on a device is used, and a problem of dot overlaying in the same pixel is not controlled, so it is difficult to reproduce a desired color.

Therefore, a method of using a color vector for generating a halftone color by the error diffusion process is proposed (as disclosed in Japanese unexamined patent publication No. 9307776). In this method, the input image data are handled as a multidimensional quantity, though they are handled as a one-dimensional quantity in the conventional method. It is naturally possible to use a color signal depending on a device as a color signal handled as a vector. However, an input image expressed by a color space such as XYZ or CIELAB that does not depend on a device, an XYZ value of an outputtable color in an output apparatus that is previously known (there are eight colors, i.e., cyan, magenta, yellow, red, green, blue, white and black for binary value) and a CIELAB value (the calorimetric value of paper is usually used as a white color) are used for performing the halftone process below. Thus, it can be expected that the output color becomes the same as the input color in a colorimetric manner theoretically.

(1) The decision of the output color is performed by comparing an input color (vector) with a potential output color (vector) and by selecting the color in which the difference between the input color and the potential output color is the smallest. Namely, the color that is the closest to the input color in the color space is selected.

(2) An error between the input color and the output color generated in the color selection is calculated.

(3) For the next pixel to be processed, an error generated in the peripheral processed pixels is added with a weight to the input color so as to correct the input color, and the process (1) is performed again.

This method is called a vector error diffusion method and can easily support an increase of the outputtable colors due to a multistep halftone and an addition of a spot color.

In the conventional vector error diffusion, it is a standard of selection to select the color in which a sum of squares of difference in each element of the color vector is minimized in the process (1). This selection standard is always used for selecting the output color.

In order to generate a desired color in a halftone image, it is necessary to satisfy the condition that an average color in a certain area including plural pixels is substantially the same as a desired color. From this viewpoint, the rule in the conventional vector error diffusion process, i.e., the rule that "the color that is the closest to the input color in the color space is selected." is effective.

However, in the conventional method, the color reproduction with good quality can be possible only in the ideal circumstance in which the dot of each pixel meets the rectangular area of the pixel correctly, and there is no overlap between the neighboring dots, no density inconsistency in the formed dot and no fluctuation of the dot position. Namely, if the conventional method is used for the actual color binary printer, it is difficult to achieve good color reproduction since each color area has its own color reproducibility.

In addition, the conventional method determines the output color of each pixel noting only the color vector and does not control the arrangement of the output color. Therefore, uneven dot arrangement can generate an undesired pattern of display.

Furthermore, as mentioned above, in the conventional method, an output color is selected by a single selection standard in which a sum of squares of difference is minimized. When this method is used in the actual color binary printer, it is difficult to achieve good color reproduction since each color area has its own color reproducibility. More specifically, there is a problem that a color saturation of a low chromatic or a monochromatic color becomes higher than a target value of the output.

In addition, in the above-mentioned conventional method, only a color is considered for determining a color of each pixel. Therefore, regardless of the color reproducibility, a dot that increases graininess in the visual image can be generated.

Namely, in the conventional vector error diffusion method, since the output color that simply minimizes a color error is selected, an undesired color pattern having a low frequency can be generated depending on the relationship between the target color and the position of the output color, resulting in a bad visual graininess.

In addition, if there are many kinds of outputtable colors, long hours are required for selecting a target output color, so it is necessary to perform the selection process simply.

SUMMARY OF THE INVENTION

The object of the present invention is to reproduce a color of an input image with high quality by using a small number of colors and to optimize the image quality except the color reproducibility. Another object of the present invention is to prevent a generation of an undesired color pattern and to improve the reproducibility of the image.

In the present invention, the rule of the selection of an output color is not limited to one rule. Some rules are used for different contents of the input image or different usages of the output image.

According to one aspect of the present invention, a method is provided that includes the steps of converting a color of each pixel of an input image into a color selected from a plurality of reproducible colors, and diffusing a conversion error accompanying the conversion into pixels surrounding the target pixel. In this method, plural rules of the selection are provided for a plurality of the reproducible colors, and one of the plural rules is selected and applied to the whole area or each divided area of the input image.

According to another aspect of the present invention, an image processing apparatus is provided that includes an error giving portion for correcting a color of each pixel of an input image in accordance with the error data, an output color selection portion for converting the color corrected by the error giving portion into a color selected from a plurality of the reproducible colors in accordance with a predetermined rule, an error calculation portion for generating data for diffusing a color error generated in the conversion by the output color selection portion into pixels surrounding the target pixel, and for giving the generated data as error data to the error giving portion, and a rule setting portion for selecting one of the plural rules in accordance with input particular data, and for giving the selected data as the predetermined rule to the output color selection portion.

According to another aspect of the present invention, a method is provided that includes the steps of applying a color error diffusion process to input color data of each pixel of an image, and selecting an appropriate output color for each pixel from a group of outputtable colors so as to output the selected color. In this method, a particular function value is selected from a plurality of unction values in accordance with the input color and each color element of the group of outputtable colors, and the selected particular function value is used for selecting the output color.

According to still another aspect of the present invention, an image processing apparatus is provided that includes an output color selection process portion for selecting an appropriate output color for each pixel of an image from a group of outputtable colors, and an error diffusion process portion for diffusing an error generated in the selection by the output color selection portion to pixels surrounding the target pixel. The apparatus selects an appropriate output color and outputting the selected color by performing a color error diffusion process to the input color data of each pixel. The output color selection process portion selects a particular function value from the plural function values in accordance with the input color and each color element of the group of outputtable colors, and the output color selection process portion uses the selected particular function value so as to select the output color.

Furthermore, other embodiments of the present invention will be described with reference to examples and drawings below.

BRIEF DESCRIPTION OF THE DRAWINGS

FIG. 4A is a block diagram of the image processing apparatus according to a fourth embodiment of the present invention.

FIG. 4B shows an example of a dither matrix M that is used by means for giving the position information of the target pixel.

FIG. 8 shows examples of the function equation to be a selection standard.

DESCRIPTION OF THE PREFERRED EMBODIMENTS

Hereinafter, the present invention will be explained in detail with reference to embodiments and drawings.

Figure 1:
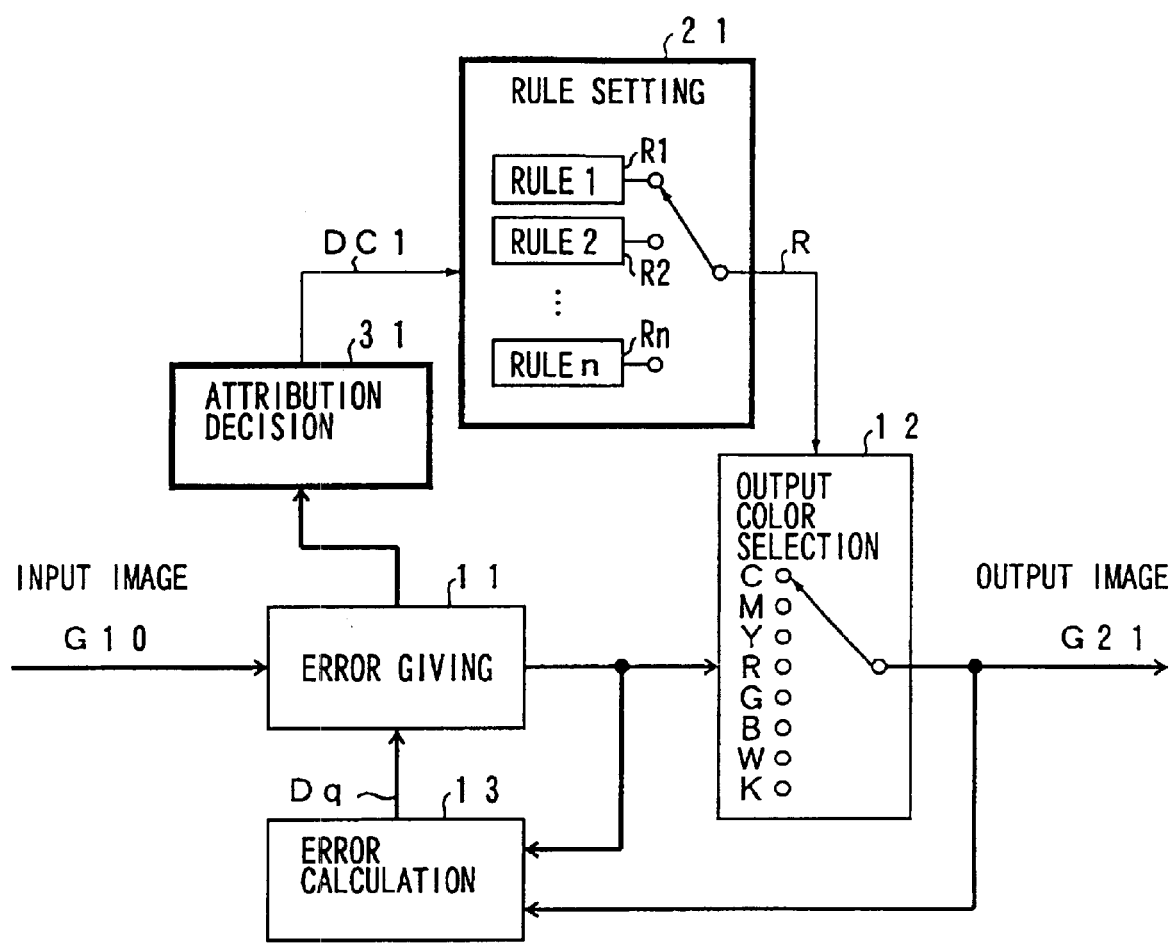
FIG. 1 is a block diagram of an image processing apparatus according to a first embodiment of the present invention.

FIG. 1 is a block diagram of an image processing apparatus according to a first embodiment of the present invention.

The image processing apparatus 1 is means for converting the number of colors for printing, displaying or saving. The image processing apparatus 1 is built in a computer system or a color printer for use. In the image processing apparatus 1, an error giving portion 11, an output color selection portion 12, and an error calculation portion 13 are fundamental elements for the conversion of the number of the colors in an error diffusion format. A rule setting portion 21 and an attribution decision portion 31 are additional elements that are unique to the present invention.

The functions of the fundamental elements are the same as in the conventional apparatus, so the general explanation of them will be given here.

For the input image G10, the process is performed one by one pixel in the direction of raster scan. The error giving portion 11 corrects the data of the target pixel of the input image G10 in accordance with the error data Dq given by the error calculation portion 13. The error data Dq indicate one that is assigned to the target pixel out of the distribution errors that were imparted to the surrounding pixels after weighting a color conversion error of previously processed pixel. The assignment of the error is performed by using a weight matrix (also referred to as a diffusion matrix, not shown), and the target pixel is given an error from the plural pixels in the matrix. Therefore, the error data Dq are the sum of the distribution error of the plural pixels. The error calculation portion 13 adds a distribution error for each pixel sequentially and memorize the same in accordance with the output of the error giving portion 11 and of the output color selection portion 12. The output color selection portion 12 selects one of the options of the output color in accordance with a predetermined rule for the target pixel that was corrected in the error giving portion 11. The output image G21 is reproduced in the selected output color. In this example, the output apparatus for reproducing the image is a binary color printer, and one of eight outputtable colors (i.e., cyan (C), magenta (M), yellow (Y), red (R), green (G), blue (B), white W) and black (K) is selected. In addition, the images from the input through the output in the image processing apparatus 1 are handled as XYZ color space data (however, they can be multi-dimensional data in the other color space such as CIELAB color space).

The most important feature of the image processing apparatus 1 is that the rule setting portion 21 is provided, and the rule for selecting the output color can be controlled in accordance with a predetermined information (i.e., particular data).

The rule setting portion 21 is supplied with color attribution data DC1 as particular data from the attribution decision portion 31. The attribution decision portion 31 converts the color that was corrected by the error giving portion 11 (or the color before correction) into three attributions of a tint, a lightness and a saturation so as to decide the color attribution. The rule setting portion 21 selects one of the memorized n (n≧2) rules R1–Rn that matches the value of the color attribution data DC1 and gives it to the output color selection portion 12 as a set rule R. The rules R1–Rn include the conventional rule "In the color space, the output color that is closest to the input color is selected" (hereinafter, this is referred to as a "normal rule"). Even if the input (the target color) of the output color selection portion 12 is the same, the output color can be different when the set rule R is different. In that case, since the error diffusion is performed, the necessary condition for the color reproduction (the average color in the area including plural pixels is substantially the same as the desired color) can be satisfied.

Rules except the normal rule include, for example, the difference between yellow and the target color is regarded smaller than other colors for the color whose tint is determined to close to yellow. Thus, the phenomenon of a large change of the tint or the drop of the saturation or the lightness can be suppressed when the other color such as cyan or magenta is mixed. In addition, concerning the color that was determined to have a tint close to blue, the difference between the blue and the target color is regarded larger than the other color when the color reproduction area of the blue color outputted by the printer is particularly narrow. Thus, compared with the normal rule, the probability of selecting the cyan or the magenta color whose tint is close to the blue color becomes large, while the probability of selecting the blue color becomes small. As a result, a paramixing dot can be easily generated, and a color with a relatively high saturation can be reproduced. Even if a calorimetric color reproducibility is satisfied to some degree, there can be generated a pattern in which a visible graininess is undesired. For example, if there are black or blue dots when reproducing a flesh color, a subjective image quality is deteriorated. Though it depends on the object image and its usage, as well as how much the color reproducibility changes, the generation of the color that deteriorates the image quality can be restricted.

The color attribution is noted in the above-mentioned explanation. However, it is possible to decide space information such as an edge portion or a non-edge portion for an attribution by a space filter process from the input image G10, and to switch the rule for selecting the output color in accordance with the result of the decision. In addition, the attribution decision can be performed by a unit of plural pixels such as m×n pixel (m and n are positive integers) block, instead of one pixel unit. Furthermore, data that indicate a picture area, a graphic area or a character area can be built in the input image data in advance, so that the rule can be switched by referring the data sequentially upon the error diffusion process. In any case, the attribution decision is not necessarily performed by the binary process. A value that can be expressed by a function of a lightness for example can be set to the parameter indicating the rule, so as to set a consecutive rule.

Figure 2:
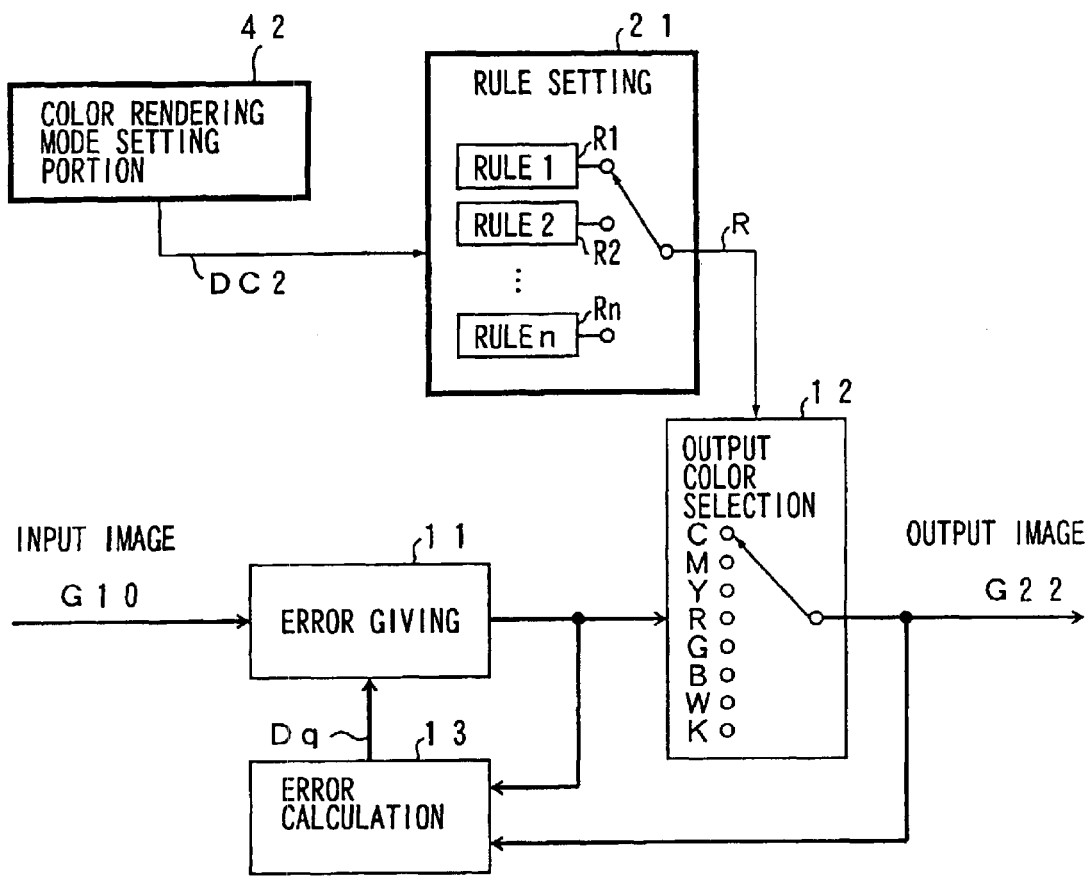
FIG. 2 is a block diagram of the image processing apparatus according to a second embodiment of the present invention.

FIG. 2 is a block diagram of the image processing apparatus according to a second embodiment of the present invention. In FIG. 2, elements having the same functions as in FIG. 1 are denoted by the same references in FIG. 1, and the explanation thereof is omitted. It is the same in the following other figures.

The image processing apparatus 2 switches the rules R1–Rn responding to an instruction of a user (including a service engineer and a network supervisor) of the printer in accordance with the mode data DC2 outputted by a color rendering mode setting portion 42.

In a usual printer, various modes can be set so that the user can obtain the best image in accordance with a purpose or usage of the print. In accordance with this mode setting, a parameter that is related to image processing such as a matrix for the dither process is set. In this example, the rules R1–Rn are one set of parameters that define the mode.

Figure 3:
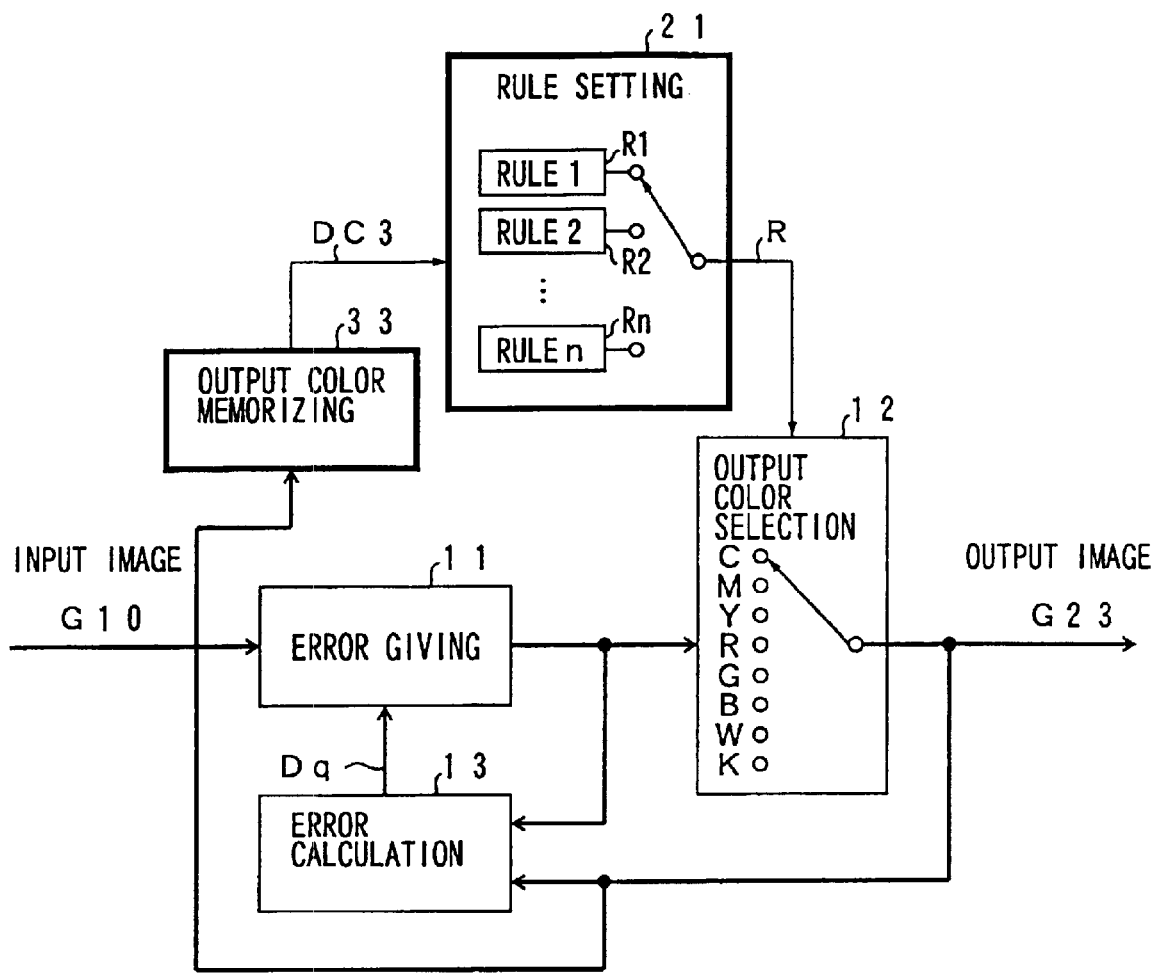
FIG. 3 is a block diagram of the image processing apparatus according to a third embodiment of the present invention.

FIG. 3 is a block diagram of the image processing apparatus according to a third embodiment of the present invention.

The image processing apparatus 3 includes an output color memorizing portion 33 for memorizing the result of selecting the output color that is already fixed, and applies the rule in accordance with the output color of the surrounding pixels for selecting the output color for the target pixel. The rule setting portion 21 is supplied with peripheral color data DC3 as the particular data.

In the process of selecting the output color in accordance with the normal rule, the target color vector V is simply compared with each output color vector Vi, and a color is selected so that the difference |V−Vi| becomes the minimum. However, the color of the pixel neighboring the target pixel affects the area of the target pixel. Therefore, the actually visible color of the target pixel may be different from the output color vector Vi. When the visible color is Vi', the rule "a color is selected so that the difference ⊕V−Vi'| becomes the minimum" is more appropriate.

FIG. 4A is a block diagram of the image processing apparatus according to a fourth embodiment of the present invention.

The image processing apparatus 4 selects one of the rules R1–Rn in accordance with position data DC4 outputted by the pixel position output portion 44, so as to apply the selected rule to the target pixel. Here, as an example of means for giving the position information of the target pixel, a dither matrix M shown in FIG. 4B is used. The dither matrix M is assigned to the input image G10 so as to define the area of the matrix size and switch the rule in accordance with the pixel position in the matrix corresponding to the target pixel. In the dither matrix M, four rules are set so that the neighboring pixels have the different rules. By performing the error diffusion process with reference to the dither matrix M, a periodicity of the dither pattern can be added to the generation of dots. Adding the periodicity, undesired generation of the texture that is unique to the error diffusion can be reduced. The undesired texture includes one that can be generated easily in a usual error diffusion process such as a snake noise and a color unevenness due to a fluctuation of the low frequency dot overlapping state (paramixing or not). It can be given in accordance with the information that is set freely in a display from a terminal that is connected to the image data process portion of the printer, instead of the configuration in that the position data DC4 is given uniquely by the dither matrix M.

Figure 5A:
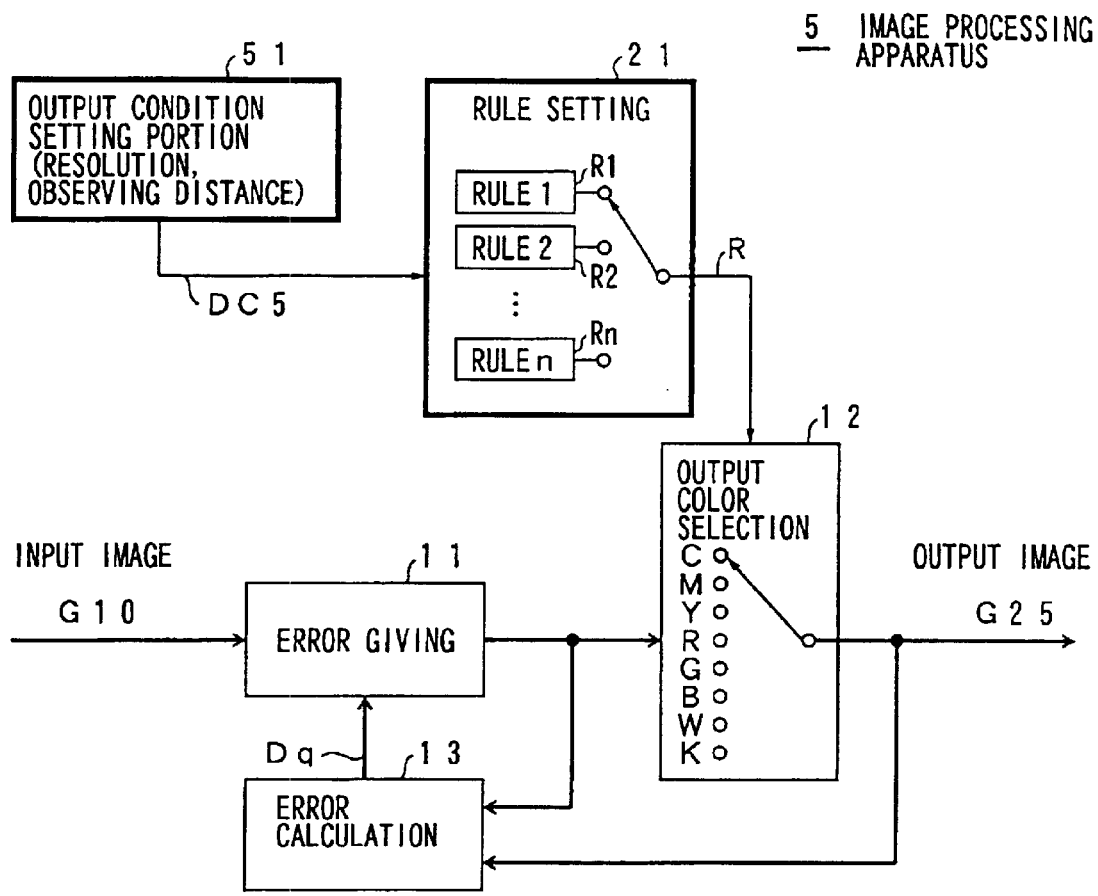
FIG. 5A is a block diagram of the image processing apparatus according to a fifth embodiment of the present invention.

FIG. 5A is a block diagram of the image processing apparatus according to a fifth embodiment of the present invention.

The image processing apparatus 5 selects one of the rules R1–Rn in accordance with condition data DC5 outputted by the output condition setting portion 51, so as to apply the selected rule to the target pixel.

The condition data DC5 indicate an observing distance that is designated in accordance with the resolution of the output image G25 (the value corresponding to the minimum pixel size in the hard copy) and a usage of the output image G25. However, it can indicate either the resolution or the observing distance.

Figure 5B:
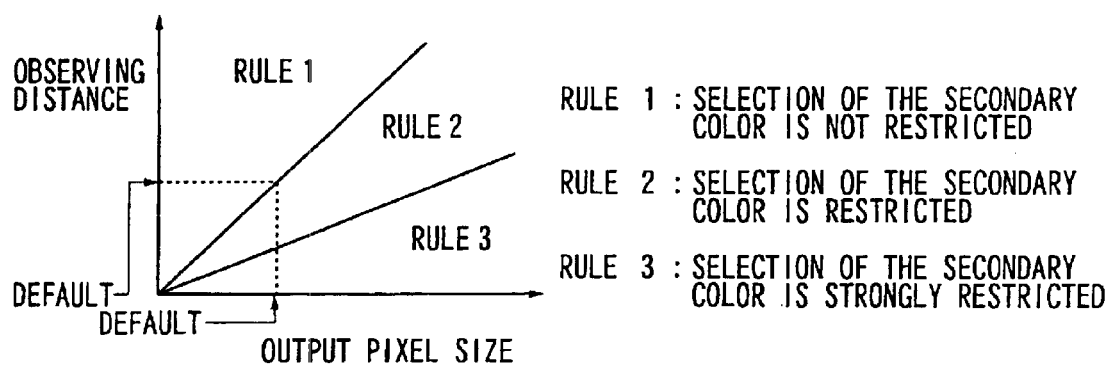
FIG. 5B shows a graph as an example of a table that is referred to by a rule setting portion for determining the set rule.

The rule setting portion 21 refers to a table having contents such as shown in FIG. 5B for determining the set rule R. In the graph shown in FIG. 5B, the larger the size of the output pixel is, or the shorter the observation distance is, the more easily the graininess becomes visible. On the contrary, the smaller the size of the output pixel is, or the longer the observation distance is, the less easily the graininess becomes visible. Under the condition that is sensitive to the graininess, the probability of generation of the primary color may be increased, and the process can be performed by the rule that hardly generates the secondary color or a higher stage color and the groundwork. In contrast, under the condition that is not sensitive to the graininess, the process can be performed by the rule that does not restrict the generation of the secondary color. This example is effective for obtaining an image with an appropriate graininess matching an observing condition when outputting the image whose observing condition can be expected such as a poster or an advertisement whose display place is limited.

In each embodiment explained above, one or more embodiments can be combined so as to obtain more various switching of the rules.

Figures 6, 7:
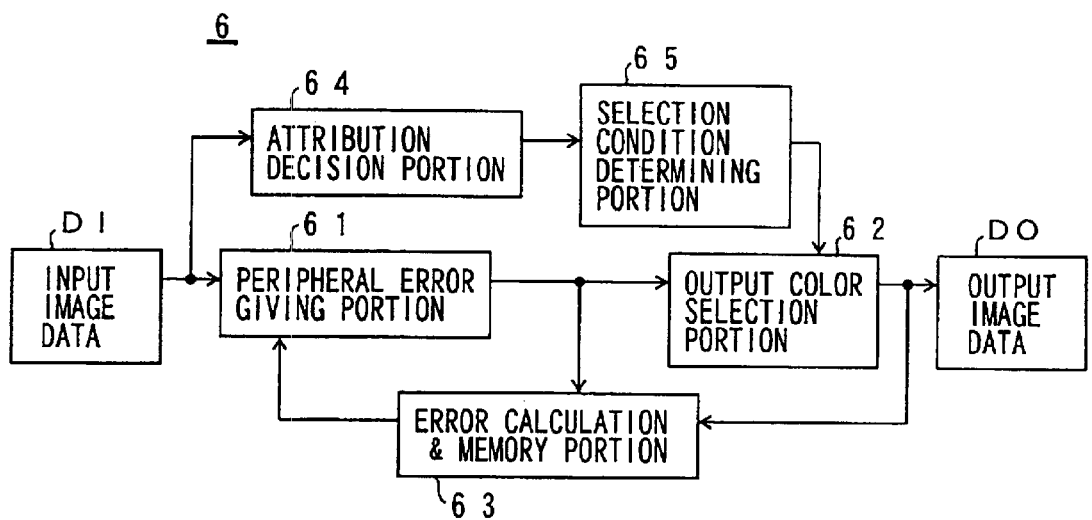
FIG. 6 is a block diagram of the image processing apparatus according to a sixth embodiment of the present invention.
FIG. 7 shows an example of a selection condition.

FIG. 6 is a block diagram of the image processing apparatus according to a sixth embodiment of the present invention.

Figure 10:
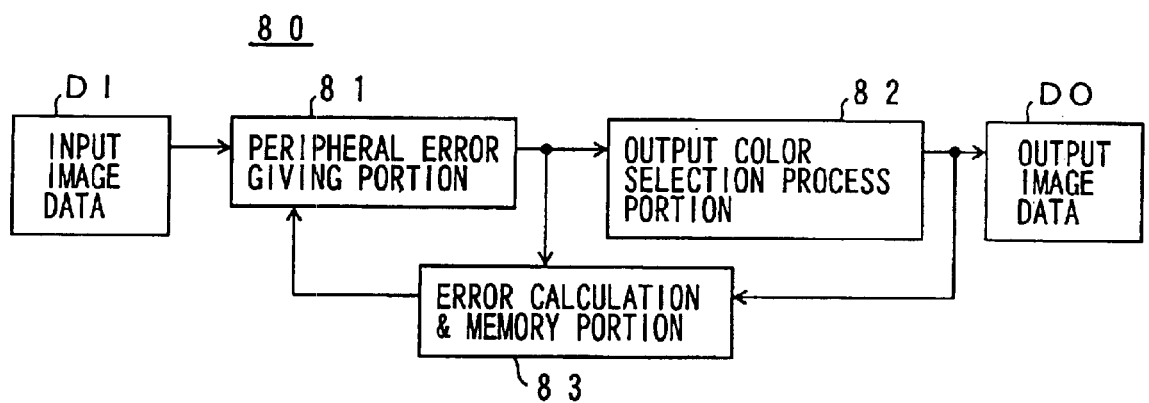
FIG. 10 is a block diagram of the image processing apparatus according to the conventional error diffusion method.

In FIG. 6, the image processing apparatus 6 includes a peripheral error giving portion 61, an output color selection process portion 62, an error calculation and memory portion 63, an attribution decision portion 64 and a selection condition determining portion 65. The peripheral error giving portion 61 and the error calculation and memory portion 63 have functions that are similar to above-explained functions in FIG. 10. Namely, these correspond to the error diffusion process portion in the present invention. The error diffusion process itself by the error diffusion process portion is similar to the conventional process, which is disclosed in the above-mentioned Japanese unexamined patent publication No. 9-307776.

A peripheral error giving portion 61 performs correction to input image data DI by distributing an error generated by the previous process. Corresponding to the corrected image data, an output color selection process portion 62 selects an appropriate color as an output color and outputs the selected color as output image data DO. An error calculation and memory portion 63 calculates an error between the image data inputted to the output color selection process portion 62 and the output color selected by the output color selection process portion 62 and memorizes the error. The selected output color is halftone data.

The peripheral error giving portion 61 gives an error that is calculated by a weight matrix with respect to an error generated in the pixel that was already processed and a position of the target pixel to the input image data DI.

The output color selection process portion 62 selects an output color in accordance with the selection condition outputted by the selection condition determining portion 65. Namely, the output color selection process portion 62 compares the image data corrected by the peripheral error giving portion 61 with the output color outputted by the selection condition determining portion 65, so as to select the output color in accordance with the selection standard outputted by the selection condition determining portion 65.

The selection condition determining portion 65 provides the following selection standards.

(1) A particular function value is selected from the plural function values in accordance with each color component of the input color and the group of outputtable colors so that an output color is selected by using the selected particular function value. Namely, the output color is selected by a function value that is different from the conventional function value in which the sum of squares of the difference between the elements is minimized.

(2) A particular output color among the group of outputtable colors is set to a selection prohibiting color, and the remaining outputtable colors are set to potential colors, so that the output color is selected from the potential colors.

The attribution decision portion 64 obtains three attributions of a tint, a lightness and a saturation from the input image data DI that are a target color, so that the attribution of the input image data DI is decided. The attribution can be obtained from the corrected image data outputted by the peripheral error giving portion 61, instead of the input image data DI.

The selection condition determining portion 65 determines a particular selection standard function (function value) from the plural selection standard functions (function value) in accordance with the attribution decided by the attribution decision portion 64. In addition, the selection condition determining portion 65 prohibits the selection of the particular output color previously and sets the potential color set.

The selected output color changes along with the change of the potential color and the selection standard. However, an error in the target pixel is calculated as explained above, and the condition can be satisfied in a certain area by the effect of the error diffusion process.

FIG. 7 shows an example of a selection condition SJ. FIG. 8 shows an example of a function equation to be a selection standard.

In FIG. 7, a condition 1-n and other conditions are set as the selection condition SJ. In each condition 1-n, sets 1-n are set as the group of outputtable colors or a set of the potential colors that were extracted from them. It is set that each of the function equation F1-Fn is minimized as a selection standard for each set 1-n.

Furthermore, in the other conditions, as the potential color set, the above-mentioned eight colors in the binary case are set, and the conventional standard in which the sum of squares of the difference of each element is minimized is set to the normal selection standard. The selection condition determining portion 65 selects one condition from the selection conditions SJ.

In the example shown in FIG. 7, both the potential color set and the selection standard are set for each condition. However, it can be possible that either of them is changed.

The output color selection process portion 62 compares the target color with values (DATA1-DATAm) determined from a selected particular function equation Fi for each color (potential color 1-m) of the determined potential color set.

Namely, the values DATA1–DATAm are shown as follows.

Fn(target color, potential color 1)=DATA1

Fn(target color, potential color 2)=DATA2

Fn(target color, potential color m)=DATAm

The minimum potential color among the function values DATA1-DATAm, i.e., the potential color k in which DATAk=Min is selected as the output color.

In FIG. 8, the function equation (a) is shown as a sum of differences among elements of XYZ after weighting by $\alpha$, $\beta$, $\gamma$, respectively.

In FIG. 8, the function equation (b) is shown as a sum of values each of which is a difference between one and the change rate of differences among elements of XYZ after weighting by $\alpha$, $\beta$, $\gamma$, respectively.

In FIG. 8, the function equation (c) is shown as a sum of values after the operation of XYZ–$L^*a^*b^*$ conversion and weighting by $\alpha$, $\beta$, $\gamma$, respectively for $|\Delta L|$ (a lightness difference), $|\Delta C|$ (a saturation difference) and $|\Delta H|$ (a tint difference).

Usually, the $CIE1976L^*a^*b$ and $L^*u^*v$, which are widely used as an equal color space for calculating a color difference, are designed so that the color difference corresponds to the visual difference. However, it is well known that the same color difference can be felt differently in reality.

For example, a color having a low saturation such as a gray color can be more sensitive to the color difference than a color having a high saturation. In addition, for the same color, even the colors having the same color difference can have the different allowance depending on the direction of the shift direction. Furthermore, complicated factors such as a chromatic adaptation and an observing condition can exist. In addition, it is possible to reduce the calculation load more in the selection process depending on the set of the function equation. Considering these various factors, the method of this embodiment explained above is effective for designing the plural outputtable colors or the potential color.

In addition, restricting the potential color set is effective in the following case. More specifically, in the tint that is close to the blue color, concerning a color whose lightness and saturation are determined to be high, if the color reproduction area of the blue color outputted by the printer is particularly narrow, the blue color is eliminated from the potential colors, so that cyan, magenta and white colors are assigned to potential colors. Thus, a paramixing dot can be generated easily, and a relatively high saturation can be reproduced.

In addition, even if the calorimetric color reproducibility is satisfied to some degree, there can be generated a pattern in which a visible graininess is undesired. For example, if there are black or blue dots when reproducing a flesh color, a subjective image quality is deteriorated. The generation of the color that deteriorates the image quality as mentioned above can be restricted.

Next, other embodiments will be explained.

Figure 9:
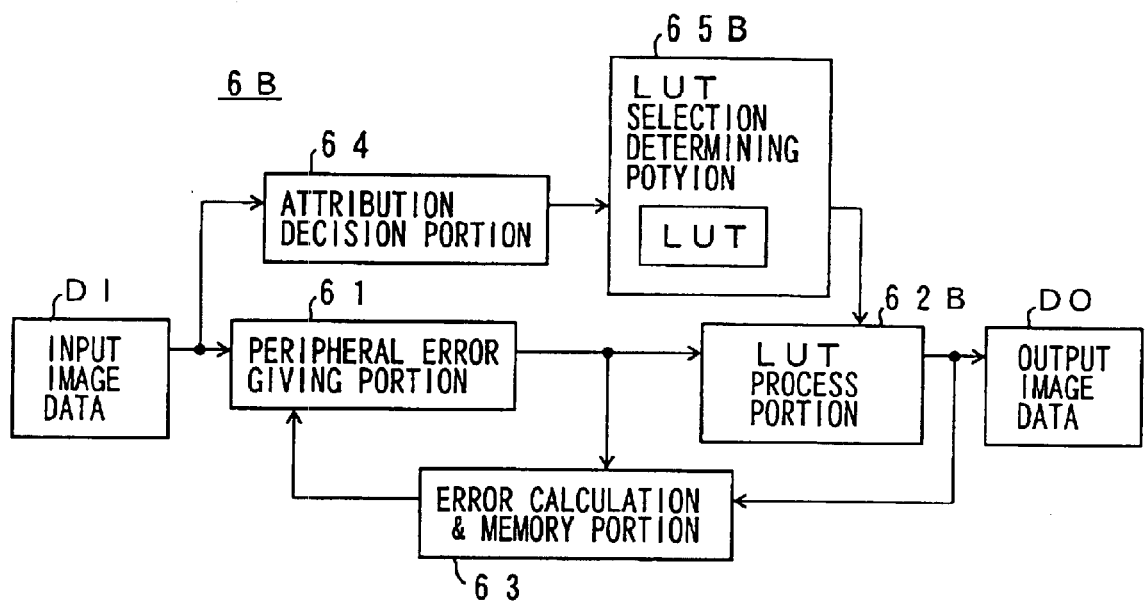
FIG. 9 is a block diagram of the image processing apparatus according to a seventh embodiment of the present invention.

FIG. 9 is a block diagram of the image processing apparatus according to a seventh embodiment of the present invention.

In the image processing apparatus 6B shown in FIG. 9, an LUT process portion 62B is provided instead of the output color selection process portion 62 of the image processing apparatus 1 explained with reference to FIG. 6. In addition, an LUT selection determining portion 65B is provided instead of the selection condition determining portion 65. Thus, the selection of the output color can be performed more speedily and more easily.

Namely, the LUT selection determining portion 65B includes a lookup table (LUT) that memorizes data of outputtable color corresponding to the input color for each selection condition. In the LUT selection determining portion 65B, in accordance with an attribution that was decided by the attribution decision portion 14, a particular lookup table is determined from the plural lookup tables. In addition, the LUT selection determining portion 65B provides a selection standard to the LUT process portion 62B in the same way as in the output color selection process portion 62.

The LUT process portion 62B uses the selected lookup table for directly determining the output color to be outputted in accordance with the corrected image data (the input color) by the selection standard that was provided by the LUT selection determining portion 65B.

According to the above-mentioned embodiment, the selection standard is not fixed to one, but there are options by preparing plural function values that can be operated from each element of the vector. In addition, the selection prohibiting color is eliminated from all prepared outputtable colors, so that the remaining outputtable colors are assigned to the potential colors and the output color is selected from the potential colors.

Therefore, even in the case where the conventional process by the uniform selection standard causes some problem in the image quality, according to this embodiment, a generation frequency of a necessary color can be increased, a generation frequency of an undesired color can be restricted, and a generation pattern of a color or a dot can be controlled. Thus, characteristics of an image can be controlled in accordance with a kind or a usage of the image, a generation of an undesired color pattern is prevented, and a reproducibility of the image can be improved.

Furthermore, by making a lookup table of the selected output color, the selected lookup table can be referred for obtaining the output color in accordance with a desired selection standard, so that the process can be performed rapidly and easily.

In the above-mentioned embodiments, the output color corresponding to an input color is selected from a group of outputtable colors. However, it is also possible to use an attribution such as decision information of the edge portion or the non-edge portion obtained from the input image data by using a space filter process, so that the selection standard is switched in accordance with the result.

In addition, in the above-mentioned embodiments, one pixel is used as a unit for selecting the output color or for deciding the attribution. However, a block including m×n pixels (m and n are positive integers) can be used as a unit. In other wards, the block can be considered as a pixel for selecting the output color or for deciding the attribution. In addition, the decision of the attribution can be performed by the binary process, or a consecutive setting is also possible by setting e.g., a lightness function to a parameter indicating the selection standard.

Furthermore, a signal indicating a picture area, a graphic area or a character area can be built in the input image data DI in advance, so that the signal can be referred to sequentially upon the error diffusion process. In addition, above-mentioned various methods or configurations can be combined as appropriate.

In the above-mentioned embodiments, the configuration, the circuit, the process contents and the process timing of each part or the whole of the image processing apparatuses 1–6 or 6B can be modified as appropriate within the scope of the present invention.

In the above-mentioned embodiments, each part of the image processing apparatuses 1–6, 6B can be composed of one or more integrated circuit chips. It can be also possible to perform image processing by executing a program stored in the memory by CPU. The image processing apparatuses 1–6, 6B can be applied to an image forming device such as a copier or printer which deals with a color image, and also applied to various devices with image processing function including an image processing system utilizing a computer.

According to the above-mentioned embodiments of the present invention, a color of an input image can be reproduced with high precision by a small number of colors, and the image quality except the color reproducibility can be optimized. Since a pattern of colors and dot generation can be controlled by selecting the output color of the pixel and by using plural different rules, a problem of the image quality that can occur in the process by a uniform rule can be canceled according to the present invention, and the quality of the image can be improved. In addition, in accordance with the kind and the usage of the image, the characteristics of the image can be controlled.

According to the above-mentioned embodiments of the present invention, generation of an undesired color pattern can be prevented and the reproducibility of the image can be improved.

According to the above-mentioned embodiment of the present invention, the process can be performed more rapidly and more easily.

What is claimed is:

1. An image processing apparatus comprising:

an error giving portion for correcting a color of each pixel of an input image in accordance with error data;

an output color selection portion for converting the color corrected by the error giving portion into a color selected from a plurality of the reproducible colors in accordance with a predetermined rule;

an error calculation portion for generating data for diffusing a color error generated in the conversion by the output color selection portion into pixels surrounding a target pixel of the input image, and for giving the generated data as error data to the error giving portion;

a rule setting portion for selecting one of plural rules in accordance with input particular data, and for giving the selected data as the predetermined rule to the output color selection portion; and an output color memorizing portion for memorizing the result of the color conversion by the output color selection portion, wherein the particular data indicate the result of the color conversion for the pixels surrounding the target pixel.

2. The image processing apparatus according to claim 1, further comprising an attribution decision portion for deciding an attribution of each pixel of the input image, wherein the particular data indicate the result of the decision by the attribution decision portion.

3. An image processing apparatus comprising:

an error giving portion for correcting a color of each pixel of an input image in accordance with error data;

an output color selection portion for converting the color corrected by the error giving portion into a color selected from a plurality of the reproducible colors in accordance with a predetermined rule;

an error calculation portion for generating data for diffusing a color error generated in the conversion by the output color selection portion into pixels surrounding a target pixel of the input image, and for giving the generated data as error data to the error giving portion; and a rule setting portion for selecting one of plural rules in accordance with input particular data, and for giving the selected data as the predetermined rule to the output color selection portion, wherein the particular data have a value that is determined by a dither matrix.

4. The image processing apparatus according to claim 3, wherein the particular data indicate a mode selection state for a plurality of color rendering modes.

5. An image processing apparatus comprising:

an error giving portion for correcting a color of each pixel of an input image in accordance with error data;

an output color selection portion for converting the color corrected by the error giving portion into a color selected from a plurality of the reproducible colors in accordance with a predetermined rule;

an error calculation portion for generating data for diffusing a color error generated in the conversion by the output color selection portion into pixels surrounding a target pixel of the input image, and for giving the generated data as error data to the error giving portion; and a rule setting portion for selecting one of plural rules in accordance with input particular data, and for giving the selected data as the predetermined rule to the output color selection portion, wherein the particular data indicate at least one of a resolution and an observing distance of the output image to which the result of the color conversion by the output color selection portion is applied.

6. The image processing apparatus according to claim 5, wherein the particular data indicate a position of the target pixel.

7. A method for processing an imager, comprising the steps of:

applying a color error diffusion process to input color data of each pixel of an image; and selecting an appropriate output color for each pixel from a group of outputtable colors so as to output the selected color, wherein a particular function value is selected from at least two function values out of four functions including $$\alpha|\Delta X|+\beta|\Delta Y|+\gamma|\Delta Z|=\text{Min},$$

$$\alpha|1=\Delta X/Xt|+\beta|1=\Delta Y/Yt|+\gamma|1-\Delta Z/Zt|=\text{Min},$$

$$\alpha|\Delta L|+\beta|\Delta C|+\gamma|\Delta H|=\text{Min, and}$$

a function having the minimum difference value after comparison between an input color and a potential output color.

8. An image processing apparatus, comprising:

an output color selection process portion for selecting an appropriate output color for each pixel of an image from a group of outputtable colors; and an error diffusion process portion for diffusing an error generated in the selection by the output color selection portion to pixels surrounding a target pixel of the input image, the apparatus selecting an appropriate output color and outputting the selected color by performing a color error diffusion process to the input color data of each pixel, wherein the output color selection process portion selects a particular function value from at least two function values out of four functions including $$\alpha|\Delta X|+\beta|\Delta Y|+\gamma|\Delta Z|=\text{Min},$$

$$\alpha|1=\Delta X/Xt|+\beta|1=\Delta Y/Yt|+\gamma|1-\Delta Z/Zt|=\text{Min},$$

$$\alpha|\Delta L|+\beta|\Delta C|+\gamma|\Delta H|=\text{Min, and}$$

a function having the minimum difference value after comparison between an input color and a potential output color.

9. The image processing apparatus according to claim 8, further comprising a lookup table memorizing data of the group of outputtable colors corresponding to the input color, wherein the output color selection process portion uses the lookup table for selecting the output color.

10. An image processing apparatus, comprising:

an output color selection process portion for selecting an appropriate output color for each pixel of an image from a group of outputtable colors; and an error diffusion process portion for diffusing an error generated in the selection by the output color selection portion to pixels surrounding a target pixel of the input image, the apparatus selecting an appropriate output color an outputting the selected color by performing a color error diffusion process to the input color data of each pixel, wherein the output color selection process portion selects a particular function value from at least two function values out of four functions including $$\alpha|\Delta X|+\beta|\Delta Y|+\gamma|\Delta Z|=\text{Min},$$

$$\alpha|1=\Delta X/Xt|+\beta|1=\Delta Y/Yt|+\gamma|1-\Delta Z/Zt|=\text{Min},$$

$$\alpha|\Delta L|+\beta|\Delta C|+\gamma|\Delta H|=\text{Min, and}$$

a function having the minimum difference value after comparison between an input vector and a potential vector.

11. The image processing apparatus according to claim 10, further comprising a lookup table memorizing data of the group of outputtable colors corresponding to the input color, wherein the output color selection process portion uses the lookup table for selecting the output color.

\* \* \* \* \*